(No Model.)

C. C. READ.
BERRY PICKER.

No. 500,613.  Patented July 4, 1893.

Witnesses  
E. N. Stewart.  
J. H. Siggers.

Inventor  
Charles C. Read.  
By his Attorneys,  
C. A. Snow & Co.

UNITED STATES PATENT OFFICE.

CHARLES C. READ, OF MANDARIN, FLORIDA.

BERRY-PICKER.

SPECIFICATION forming part of Letters Patent No. 500,613, dated July 4, 1893.

Application filed September 6, 1892. Serial No. 445,185. (No model.)

*To all whom it may concern:*

Be it known that I, CHARLES C. READ, a citizen of the United States, residing at Mandarin, in the county of Duval and State of Florida, have invented a new and useful Berry-Picker, of which the following is a specification.

This invention relates to berry pickers; and it has for its object to provide an improved cutting device of this character adapted for use in cutting berries and other fruit from their stems, as well as for gardening purposes.

To this end the invention contemplates a clipper adapted to be connected to the hand of the operator, so that the entire hand with the exception of one finger is left free to grasp the fruit after being cut from its stem by the shears.

With these and many other objects in view which will readily appear as the nature of the invention is better understood, the same consists in the novel construction, combination, and arrangement of parts hereinafter more fully described, illustrated and claimed.

Figure 1:
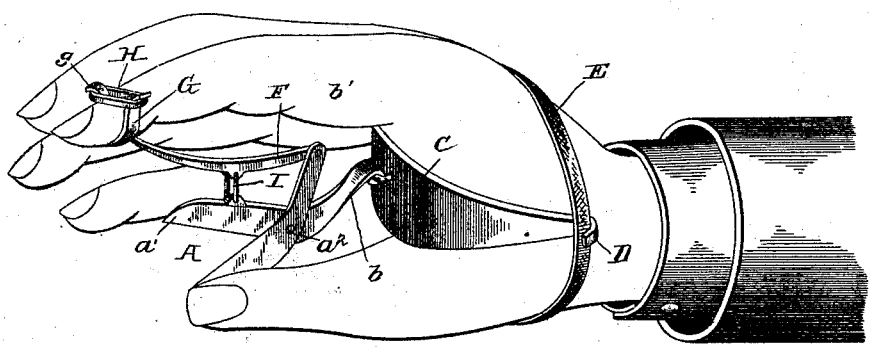
Figure 2:
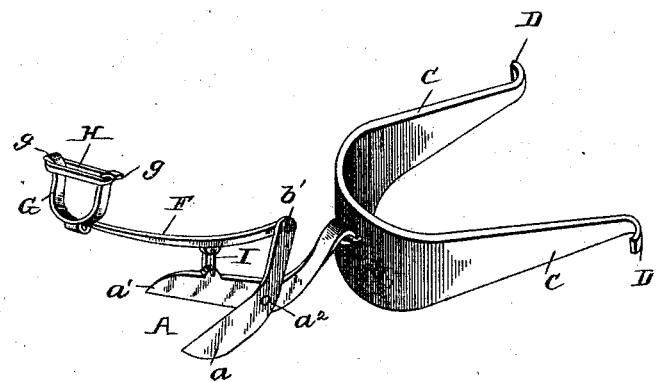

In the accompanying drawings:—Figure 1 is a perspective view of a hand to which is secured the herein described picker. Fig. 2 is a detail perspective of the device removed from the hand.

Referring to the accompanying drawings:— A represents the clipping shears, which comprise the opposing cutting blades $a$ and $a'$ pivoted together near their inner ends as at $a^2$, while each of said blades is provided beyond its point of pivot with the extended shanks $b$ and $b'$ respectively, the shank $b'$ of the blade $a'$ being extended at an angle upward from said blade and from the shank of the other blade $a$. The extreme inner end of the blade shank $b$, is pivotally connected to the outer curved end of the U-shaped attaching yoke C. The said U-shaped attaching yoke C straddles the crotch of the hand between the forefinger and the thumb and is provided with hook ends D, terminating near the base of the wrist, and designed to receive the flexible securing band E, which is adapted to be placed on the wrist and caught in said hook to hold the yoke in position and therefore the shears between the forefinger and thumb of the hand. Pivotally connected at one end to the upper end of the angle shank $b'$ is the operating connecting arm or bar F, the other end of which is pivotally connected to the under side of the forefinger half ring G. The said forefinger half ring G is provided with upper hook ends $g$, which receive the top connecting band H, which clamps the ring to the forefinger so that the cutting shears can be readily operated. A swinging connecting link I is pivotally connected to the connecting arm or bar F and the shear blade $a'$, said link materially assisting in closing the blades as the forefinger is moved toward the crotch of the hand.

Now it will be readily seen that by simply moving the end of the forefinger to which the hand is attached, toward and from the crotch of the hand, the blade $a'$ can be easily, and as rapidly as desired, operated, while the link connection I with the other loosely-connected blade $a$ gives such blade a slight motion which greatly facilitates the operation of the shears. It will also be noted that only one finger of the hand is in use to do the clipping, while all the other fingers and the thumb are entirely free to receive the clipped fruit.

Having thus described my invention, what I claim, and desire to secure by Letters Patent, is—

1. In a fruit picker, the combination of the pivoted shear blades, a U-shaped attaching yoke pivotally connected to one of said shear blades and adapted to be held stationary over the crotch of the hand, a forefinger half-ring adapted to be clamped upon the forefinger of the hand, an operating arm or bar pivotally connected to said forefinger ring and the other shear blade, and a loop connected to said arm or bar and the adjacent blade, substantially as set forth.

2. In a fruit picker, the pivoted shear blades having angled shanks, a U-shaped attaching yoke pivotally connected to the shank of one blade and straddling the crotch of the hand, said yoke having hook ends, a flexible securing band encircling the wrist and adapted to engage the hook ends of the yoke, a forefinger half ring clamped upon the forefinger of the hand, an operating connecting arm or bar pivotally connected at one end to the shank of the other blade and at its other end to said forefinger half ring, and a link connected to said arm or bar and the adjacent blade, substantially as set forth.

In testimony that I claim the foregoing as my own I have hereto affixed my signature in the presence of two witnesses.

CHAS. C. READ.

Witnesses:
JAS. B. CRABTREE,
F. CASSIDAY.